United States Patent [19]

Kilis

[11] Patent Number: 5,561,803

[45] Date of Patent: *Oct. 1, 1996

[54] COMPUTER PROGRAM PRODUCT AND PROGRAM STORAGE DEVICE FOR INCREMENTAL PROCESSING OF COMPUTER OBJECTS

[75] Inventor: Danny Kilis, Pleasanton, Calif.

[73] Assignee: International Business Machines Corporation, Armonk, N.Y.

[*] Notice: The term of this patent shall not extend beyond the expiration date of Pat. No. 5,491,821.

[21] Appl. No.: 488,030

[22] Filed: Jun. 7, 1995

Related U.S. Application Data

[62] Division of Ser. No. 21,834, Feb. 24, 1993, Pat. No. 5,491,821.

[51] Int. Cl.⁶ .................................................. G06F 15/00
[52] U.S. Cl. .................................................. 395/700
[58] Field of Search ...................................... 395/700

[56] References Cited

U.S. PATENT DOCUMENTS

| | | | |
|---|---|---|---|
| 4,558,413 | 12/1985 | Schmidt et al. | 364/300 |
| 4,658,370 | 4/1987 | Erman et al. | 364/513 |
| 4,742,467 | 5/1988 | Messerich et al. | 395/700 |
| 4,924,408 | 5/1990 | Highland | 364/513 |
| 5,170,465 | 12/1992 | McKeeman et al. | 395/700 |
| 5,182,806 | 1/1993 | McKeeman et al. | 395/700 |
| 5,193,191 | 3/1993 | McKeeman et al. | 395/700 |
| 5,201,050 | 4/1993 | McKeeman et al. | 395/700 |
| 5,313,387 | 5/1994 | McKeeman et al. | 395/700 |
| 5,325,531 | 6/1994 | McKeeman et al. | 395/700 |

FOREIGN PATENT DOCUMENTS

| | | | |
|---|---|---|---|
| 406028 | 7/1990 | Germany | G06F 9/46 |

OTHER PUBLICATIONS

Reithmaier, *Proceedings CompSac 83*, "Piecewise Compilation in Chill & It's Use in a Large Application", IEEE Computer Society's 7th Int'l Computer Software & Appl. Conference, pp. 251–252.

Hintz et al., *IBM Technical Disclosure Bulletin*, "Design of an Incremental Compiler and Interactive Interpreter Utilizing a Hybrid Token–Threaded Code", vol. 26, No. 10A, pp. 5301–5302, Mar. 1984.

Rain, *Software–Pract. & Exper. (GB)*, "Avoiding Trickle–Down Recompilation in the Mary2 Implementation", vol. 14, No. 12, pp. 1149–1157, Dec. 1984.

Christiansen, *Structured Programming* (1989) 10/4, "Structure Sharing in Incremental Systems", pp. 169–186.

*Primary Examiner*—Kevin A. Kriess
*Assistant Examiner*—John Q. Chavis
*Attorney, Agent, or Firm*—David J. Kappos, Esq.; Sterne, Kessler, Goldstein & Fox, P.L.L.C.

[57] ABSTRACT

Method and system for incrementally processing a source representation of a set of objects into intermediate representation is disclosed. The invention is used after the objects have been processed once and, therefore, have a previous intermediate representation. The object of the invention is to re-process only those objects which have been changed in some way when a modification is made. Each changed facet of a changed object is selected in turn for processing. If the selected changed facet affects the object itself, then the previous intermediate representation of the object is modified. If the selected changed facet affects objects referencing or being referenced by the first object, then the references to the first object are detached and the intermediate representation of the objects referencing or being referenced by the object are modified accordingly. If the selected changed facet modifies an attribute of other objects, due to inter-relationships such as inheritance, etc., recursively propagate the change to the intermediate representations of the objects in the affected objects by repeating the propagating step for each of the affected objects until the attribute changes to each modified object have been propagated to all affected objects. Semantic checking is then performed on each of the objects changed.

3 Claims, 4 Drawing Sheets

COMPUTER PROGRAM PRODUCT AND PROGRAM STORAGE DEVICE FOR INCREMENTAL PROCESSING OF COMPUTER OBJECTS

This application is a division of application Ser. No. 08/021,834, filed Feb. 24, 1993, now U.S. Pat. No. 5,491,821.

TECHNICAL FIELD

The present invention relates to methods and systems in the field of processing high level representations of objects in knowledge-based and object-based systems into computer executable object code.

BACKGROUND OF THE INVENTION

Computers are typically programmed by having humans enter a high level representation of the commands that the computer is to execute. The high level representation can take many forms. For example, programs can be written by entering statements in a source code language such as C or Cobol. Knowledge-based computer development systems allow users (known as "knowledge engineers") to program the computer by entering data which defines interrelated rules, frames, objects and "knowledge" at a much higher level than is typical in traditional source code. Object-based systems are similar knowledge-based systems in the complex relationships between objects. Regardless of the form of the input by the user, further processing by the computer system is usually necessary before an executable program results. The processing normally proceeds in stages or passes with the source input being modified through one or more intermediate representations. Depending on the particular program, the final output may be executable object code or interpretable code. In the case of knowledge-based or object-based computer development systems, the processing is extensive and may require a large amount of processing time. Therefore, it is important that the processing techniques be as efficient as possible.

One approach to improving the efficiency of building knowledge-based systems is to provide an incremental capability for the development environment of the knowledge-based building shell. In this way, a knowledge engineer would be able to make changes incrementally to an existing knowledge base, without having to reprocess existing information that is unaffected by the changes. This increases the productivity of the knowledge engineer and is conducive to rapid prototyping of knowledge-based systems.

The task of building a knowledge base that is solely comprised of unrelated entities incrementally is trivial. On the other hand, it is difficult to incorporate into a system the ability to handle incremental changes, if it is required to process entities that are related.

SUMMARY OF THE INVENTION

The present invention is a method and system for incrementally processing a source representation of a set of objects into an intermediate representation which can then be further processed according to the application environment. The invention functions after the objects have been processed once and, therefore, have a previous intermediate representation. The object of the invention is to re-process only those objects which have been changed in some way by an action by a user or a program. When a source representation of an object is modified, information is transferred identifying the changes made in the source representation of the object to a parser. The parser is first run on the modified source representation of the object to check for correct syntax. A list of changed facets of the base object is prepared, then each changed facet is selected in turn for processing. If the selected changed facet affects the object itself, then the previous intermediate representation of the object is modified. If the selected changed facet affects objects referencing or being referenced by the first object, then the references to the first object are detached and the intermediate representation of the objects referencing or being referenced by the object are-modified according to the changes made in the base object. If the selected changed facet modifies an attribute of an affected set of objects, due to inter-relationships such as inheritance, etc., then recursively propagate the change to the intermediate representations of the objects in the affected objects by repeating the propagating step for each of the objects in the affected set of objects until the attribute changes to each modified object have been propagated to all affected objects. Semantic checking is then performed on each of the objects changed.

DETAILED DESCRIPTION OF THE INVENTION

Figure 1:
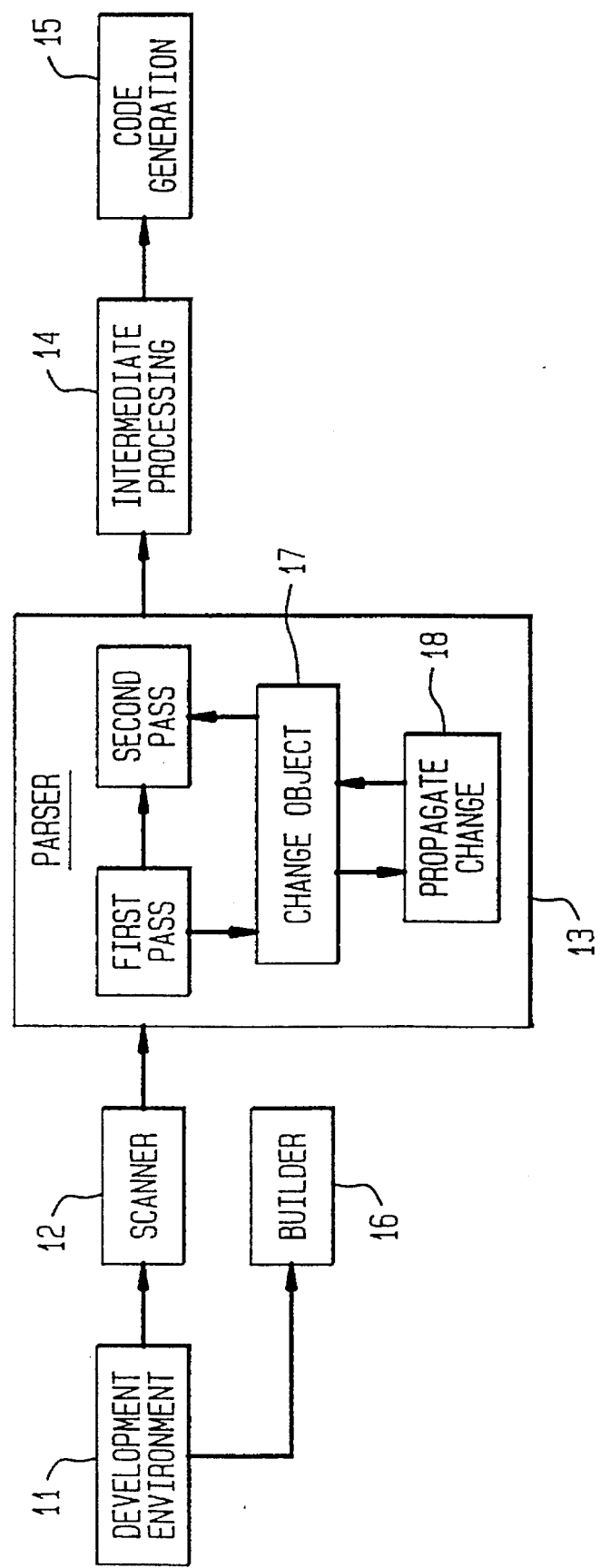
FIG. 1 is a block diagram of the major components of the invention and its operating environment.

This invention is a method and system for the incremental processing of knowledge-based or object-based objects. A knowledge-based building shell can be described briefly as a compiler that compiles a knowledge base written in a high-level knowledge representation language into an executable form. As shown in FIG. 1, there are typically six fundamental stages involved in a knowledge base building shell: development environment (DE) 11, scanner 12, parser 13, intermediate processing 14, code generation 15, and builder 16. The parser component can usually be subdivided into two passes for syntactic and semantic analyses. The detailed embodiment of the invention integrates an incremental scheme into the parsing stage, so that existing intermediate representations can be modified according to the incremental changes that are made by the user, and new information can be passed to the code generation to determine the necessity of regenerating code for the objects (and related objects) that are changed, and hence, to the builder for compilation and linkage of the newly generated files.

To describe the detailed embodiment of the invention, reference will be made to "The Integrated Reasoning Shell (TIRS)", a commercially available IBM Corporation product, which is a tool for building knowledge-based applications. It allows knowledge engineers to construct reasoning systems capable of data-driven or goal-driven forms of inferencing by expressing knowledge in terms of rules. Data referenced by the rules can be expressed in different forms, such as, parameters and frames. Parameters represent simple data elements that are static and global to the knowledge base. On the other hand, frames offer more powerful and flexible ways of representing entities in the problem domain than parameters. A frame is an abstract data type that specifies the attributes of its instance's slots.

A frame may contain two kinds of slots. The first, termed "value slot", represents the attributes of the entity characterized by the frame; the second, termed "relation slot", represents the relationship of the frame with other frames. A frame's value slots are usually used to describe attributes of the frame and its relation slot used for describing the relationship with other frames. For example, if we wish to describe a geometrical shape of a 2-dimensional shape, we may wish to represent circle, square and rectangle with frames. The circle frame may have different attributes, such as circumference, radius, area, perimeter; while the square and rectangle frames may contain attributes such as width and length, perimeter and area. Since we see some attributes that are common in these shapes, we may create an abstract shape frame that contain the area and perimeter attributes. The relation slots of the circle, square and rectangular frames could then specify an inheritance relationship with the abstract (i.e., non-instantiable) shape frame. The circle, square and rectangle frames would be instantiable.

The value slot consists of some facets that identify the attributes of that slot. These facets may include the initial value of the slot and some constraints factors, such as forward or backward chainings. The value slot's facets are also present in a parameter. However, a parameter can only express a set of attributes settings; whereas, a frame may contain multiple value slots that represent a variety of attributes settings. In addition, frames may represent related entities through their relation slots. A relation slot is composed of specifications of the kind of relation and the related entities. Knowledge engineers are able to specify multiple relationships among different entities. Two kinds of relationships are available among frames, namely, the inheritable and non-inheritable ones. The inheritability of the relationship can be specified in TIRS's Relation object. Within an inheritance hierarchy, slots and facets can be inherited by child frames from parental frames unless locally overridden at child frames level. Inheritance links among frames may only be established at definition time; whereas, such kind of links among instances may be created both at definition and execution time.

The facets of the parameter or value slot may also contain a reference to an external source that is either synchronously or asynchronously invoked when certain conditions are met. The external source can be in the form of another knowledge base written in TIRS language, procedural routine, or user's responses. In addition, TIRS also allows direct reference to an external routine from the rule or arguments of the sources. The rules, parameters, frames, static instances, sources, external routines, and relations will generally be referred to as objects of separate entities in this document. The above has briefly described the knowledge-based objects present in the TIRS language and their inter-relationships.

Whenever a user's object is referencing another object, there exists a pointer from the Intermediate Representation (IR) of this object to that of the others. Thus, when a rule is referencing a frame, an instance, or an external routine, there will be pointers that connect the rule's IR to the other objects' IR. However, when a user makes a change to the definition of a rule the references must be detached, since the new rule definition may not reference different objects than before. In addition, one must keep in mind that such references may be bidirectional in certain cases; e.g., an instance refers to a source and the source refers to a slot of the same instance.

In the detailed embodiment two new components, named CHANGE_OBJECT 17 and PROP_CHANGE 18, are responsible for processing incremental changes to the IR, as shown in FIG. 1. The purpose of the CHANGE_OBJECT component is to modify the parser data structure according to the information passed from the development environment (DE) to the parser. The DE transforms the operations performed by the user into a grammatical form recognizable by the parser. The first pass of the parser (FP) then translates the new grammar into a new data structure, and passes the new structure to the CHANGE_OBJECT function. The CHANGE_OBJECT function analyzes the type of changes made by the user, and reflects them on the parser structure for the objects that have been modified. Analysis of objects is performed at the facet level. In general, when some facets of an object are modified, the other objects that refer to and are being referred to by it must be considered. For example, when a frame's value slot is referencing a source and the former is being referenced by a rule, a change in some facets of the value slot may necessitate the reprocessing of the frame instances, source, and rule. However, a change to the initial value of the slot may only require corresponding changes to the instances' slots. In other words, in considering the actions that need to be performed in the event of a change activity, the type of the object being changed, its relationship to other objects, and the sort of change that is clone are analyzed. Thus, the CHANGE_OBJECT function makes the optimal decision to reprocess the least number of related objects based on the facets that have been changed by the knowledge engineer.

The above example illustrates a means to handle inter-object references among different kinds of objects in the event of a change. On the other hand, there are some objects that have references to their own kinds, namely, frames and their instances. A frame or an instance may have inheritable or non-inheritable relationships to other frames or instances, respectively. The inheritable relationship among frames (or instances) is special in that some attribute values of the slots from the parental frame are propagated to those of the child. This type of inheritance is commonly known as structural inheritance. Structural inheritance complicates the incremental processes in two ways. First, the topographical arrangement of the inheritance network has to be considered in propagating the effects of changes throughout the inheritance network. For example, a child may be linked with inheritance relationship to two or more parents, so there needs to be some way of distinguishing the "real" parent from the others that are linked to the child. The distinction should also be made at the slot level instead of at the object level, since some parents may not contain the slot that the child inherits from. Similarly, a parent may have two or more children that it has to propagate information to. Second, the propagation of changes in the inheritance network must also consider the kind of operations (such as deletion or addition) performed and the type of facets modified by the user at the slot level. For example, the propagation of the deletion of a slot in a parental frame should be stopped when a local value slot in the inheritance chain is detected. On the other hand, the propagation of inheritance of the addition of a value slot in a parent continues throughout the inheritance chain, and the decision of whether to inherit an attribute belonging to the newly created value slot is done at the facet level. Thus, in general, the PROP_CHANGE component analyzes the kind of information that needs to be propagated throughout the inheritance network and resets the state of the related objects and their attributes accordingly. Actual propagation of the newly modified attributes throughout the inheritance network is done in the second pass of the parser.

When the user makes a change to an object on the DE, the information about which object is modified and which part of the object has been modified is passed from the DE to the first-pass of the parser. Having collected this information the first-pass checks for syntax errors, and then it calls the CHANGE_OBJECT component. The CHANGE_OBJECT component fetches the old object and transfers the changes from the new object to the old one and does the granular analysis to minimize the amount of changes that need to be propagated to the entire system.

Figure 2:
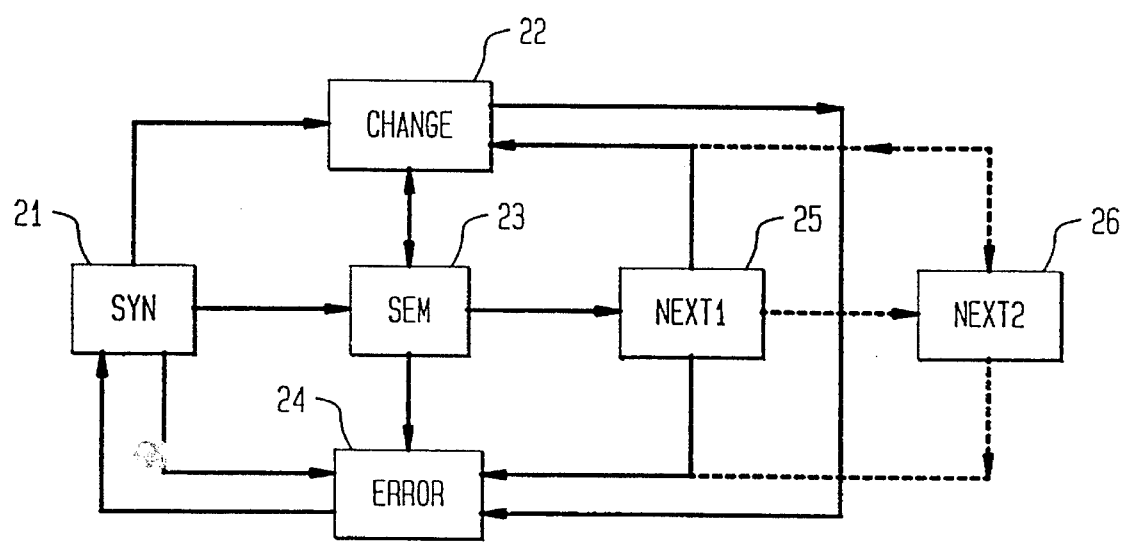
FIG. 2 illustrates the state transitions for objects being processed in accordance with the invention.

Actions that are performed on objects in the CHANGE_OBJECT and PROP_CHANGE components have modified the original states of the objects, and the new states are recorded so that the subsequent components of the translator can decide on their appropriate actions in response to the changes in the knowledge base. FIG. 2 illustrates the state transition that is used in the system. The SYN state 21 refers to an object that has successfully gone through the first pass of the parser; the SEM state 23 refers to the one after the second pass; and the NEXTI state 25 is used to denote the object that goes through the stages after the second pass. For example, NEXT1 state 25 can represent the state that the object enters after the second pass such as code generation or builder phase. For different implementation considerations, there may need to be more than one state to distinguish stages after the second pass. These are designated as NEXT1 25 and NEXT2 26 in FIG. 2, but the number is not limited to two. The CHANGE state 22 is a temporary state that an object generally goes through whenever parts of that object are modified. For example, if an object is currently marked as SYN, it will be marked as CHANGE as it goes into the CHANGE_OBJECT function and it proceeds to the second pass and so forth after the necessary modification to its structure has been made. On the other hand, if a SEM or NEXT1 object is changed, it will also be marked as CHANGE, but its previous state should be stored and used to mark the object after having gone through the semantic checks. This is done to avoid reprocessing the object through the stages that it has already undergone. Finally, the ERROR state 24 is used to identify objects that are in error or invalidated by an error in other objects. Subsequently, the objects in the ERROR state will revert to its first-pass structure. It is for this reason and other situations requiring an object's structure be reverted to its first-pass one, that the first-pass structure of every object in the knowledge base is stored in memory.

Without the CHANGE_OBJECT and PROP_CHANGE components, the DE would pass information on the entire knowledge base to the parser in the event of even a minor change to the knowledge base. In the meantime, the parser would reconstruct its data structure entirely based on the information from the DE. Thus, the entire knowledge base would be re-processed and rebuilt each time due to changes made by the knowledge engineer. The design documented here limits the necessary re-processing by providing a granular level of analysis on the kind of changes made by the knowledge engineer, and the type of objects being changed. This analysis is incorporated into the parsing phase, because the IR created in this phase comprises the root of the data structure representing the knowledge base. Thus, for every change in the knowledge base, the DE would pass only the information relevant to that change, and the processing performed by the parser and the subsequent components would be minimized.

Parsing is an important phase of compiler construction and design. It involves the grouping of the tokens of a computer language into an intermediate representation, including the Parse Tree, symbol table, etc. The parsing phase is comprised of two major operations: syntactic and semantic analyses. The former refers to a process of building an initial structure of the IR, while assuring that the source program is in conformance to the syntactic specification of the language. On the other hand, the latter completes the construction of the IR, while checking the source program for semantic errors, and also, gathering type information for the subsequent phases of the compiler construction.

The design of an incremental builder must include a parser that is capable of retaining and modifying the IR of the source program, based upon the incremental operations performed by the user. A general and straightforward approach to designing such an incremental parser may be to destroy and recreate the representations of the objects that are added, deleted or modified in the source. Nevertheless, while this hypothetical approach may be general enough to handle all incremental operations, it causes some performance degradation in certain situations. This is especially true if the source program is written in a Knowledge Representation Language (KRL). A KRL commonly depicts conceptual objects, such as frames, instances, parameters, and rules. Some of these objects may contain attributes and be related among each other. Thus, if the above-mentioned scheme for incremental parser is used for a KRL compiler, an incremental operation performed on an object that is related to most of the objects in the source program may necessitate the reconstruction of the entire IR of most objects. In this invention, two components, namely, CHANGE_OBJECT and PROP_CHANGE are introduced to only induce necessary changes on the parser structure based on the types, properties, and attributes of objects that are modified by the knowledge engineer.

Figure 3:
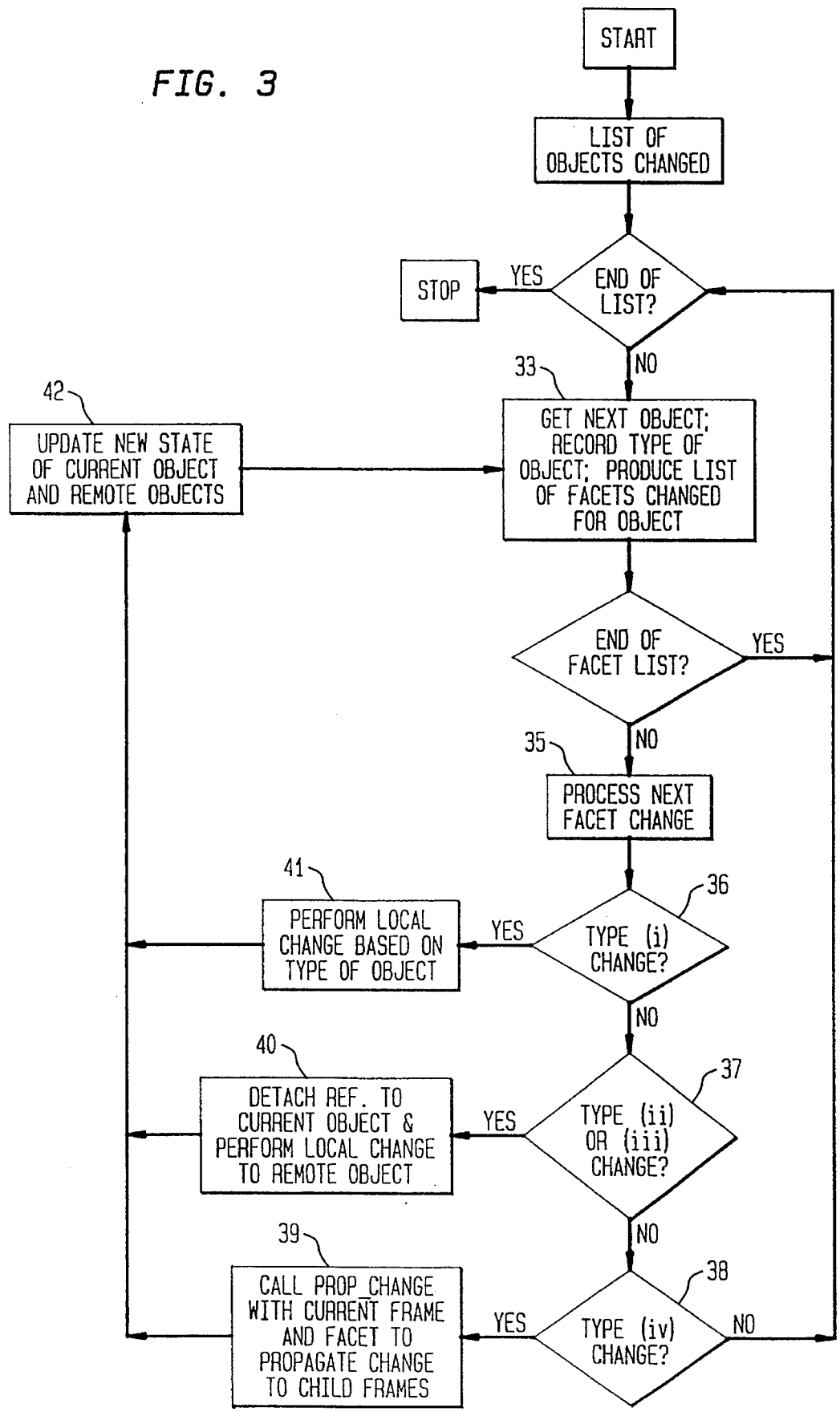
FIG. 3 is a high level flow chart for the detailed embodiment of the CHANGE_OBJECT component in accordance with the invention.

FIG. 3 is a high level flow chart of the CHANGE_OBJECT component. The CHANGE_OBJECT component decides what modifications are to be made on the IR based on the facet-level information provided by the DE 31. Changes to objects must be broken down into facets which are then processed individually. A facet list is prepared for each object changed 33. When constructing the decision logic for CHANGE_OBJECT, it is important to note the difference between inter-objects references (among objects of different kinds) and intra-objects references (among objects of the same kind). When a facet change involves an object that has only inter-objects references in the knowledge base, the only changes required to the remote objects are "local" (i.e., no further propagation of objects' attributes is needed). Whereas, when the object contains intra-objects references, the changes of attributes may need to be propagated throughout the network. In addition, four types or situations may arise due to a change in some facets of the object: (i) the change is local and independent of other objects; (ii) the change requires some local changes to objects referencing this object; (iii) the change requires some local changes to objects that are referenced by this object; (iv) the change requires propagation of attributes to other objects (this would be handled by the PROP_CHANGE component) 38. Sometimes a combination of different types of situations may occur for some facets changes.

The general logic flow for the CHANGE_OBJECT component is outlined below:

For each facet or slot (slot change may include deletion or addition of a slot) changed do the following:

1. Examine the type of object being changed.

2. If the facet being changed falls into type (i) category 36 then simply perform local changes to appropriate data structure 41. An example would be a change to the value of a parameter.

3. If the facet or slot being changed falls into type (ii) and/or (iii) categories 37, then detach the references to this object and perform any local changes to the remote objects 40. For example, a rule can reference many kinds of objects, but it cannot be referenced by other objects. Thus, any change to the rule falls into category (iii). On the other hand, modifying the sources reference of a parameter would fall into categories (ii) and (iii), since the original references from the source to the parameter and vice versa, have to be revised.

4. If the facet or slot being changed falls into type (iv) category 38 then switch handle to execute the PROP_CHANGE component 39. Examples of this category often involve changes to some facets of the slots belonging to a frame or instance that is linked to other frames or instances, respectively.

5. Change the state of the object and perform any remaining local changes that need to be made 42. The state of the object is mainly used to determine the appropriate actions to be performed by the second pass parser and components thereafter. The general state diagrams are summarized in the summary sections and illustrated in FIG. 2. The complexity of the local changes varies from simply modifying the field of a structure (as in the case of the CHAINING facet of a parameter) to recovering the first-pass structure for the current object (as in the case of a rule body change). The second case necessitates the system to keep an image copy of the first-pass structure for each object from which it can be recovered. This image copy is also used by the system to recover from semantic errors that occur in components subsequent to the first-pass parser.

It is important to note that cases (2) through (4) may not be relevant to all facet changes, and yet, in other situations, these cases may all be relevant. Thus, these cases have to be examined individually based on the kind of object being changed, the property of the facet being changed, and the relation of this change to other objects. It is this granular level of analysis that provides the system the ability to direct the minimum amount of effort to effect the change made by the knowledge engineer.

Figure 4:
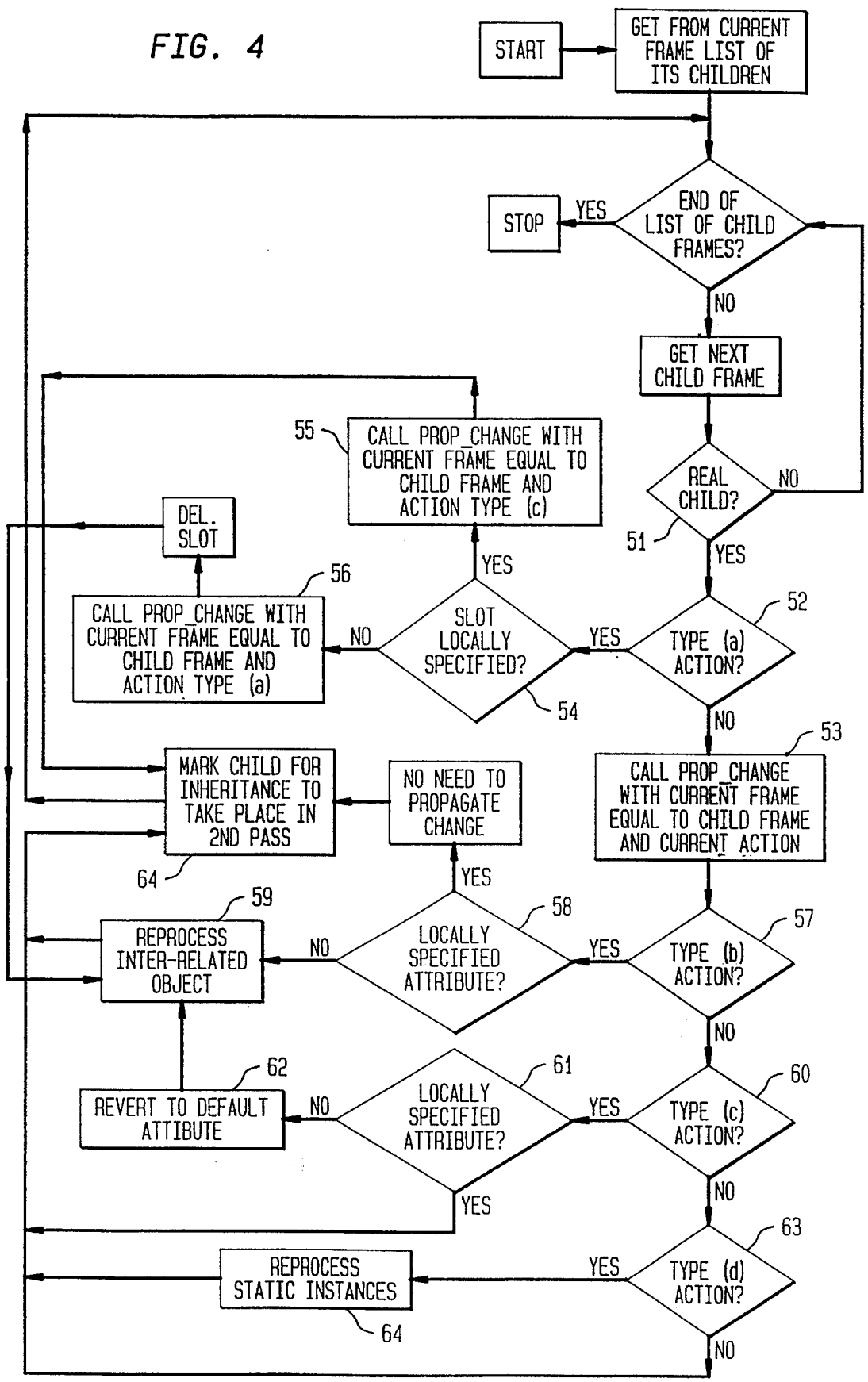
FIG. 4 is a high level flow chart for the detailed embodiment of the PROP_CHANGE component in accordance with the invention.

The PROP_CHANGE component is the second major portion of the incremental processor of the parser. FIG. 4 is a high level flowchart of the PROP_CHANGE component. As mentioned above, the objective of this component is to propagate the changes to a frame to its children and grandchildren in the inheritance network. The changes to be propagated may involve: (a) the deletion of a value slot, (b) the modification of an attribute of a slot, (c) the undoing of inheritance for some attributes of the slot, and (d) the addition of the slot. To understand the logic of the PROP_CHANGE component, one must first understand how structural inheritance takes place in the system. The second pass of the parser has the responsibility to perform structural inheritance task in the system, because the semantic checking of the frames slot can only be carried out after all attributes of the slots are static. Thus, the second pass recursively copies structures and slot attributes based on the presence of the inheritance links, the order of precedence of the links, the inheritability of the parental slots, and the presence of the slots to be copied in the child frame. Each processed frame is marked so that it would not be reprocessed. Each slot that has inherited something is linked to the parental slot, so that the appropriate parental slot can be easily determined in the case of multiple inheritance (i.e., where the child has inheritance links to two or more parents containing slots of the same name). In addition, each inheritable attribute of the slot is marked as locally specified or inherited. This distinction is important, since the PROP_CHANGE component may need to undo the inheritance that was previously performed before a change is made.

The propagation logic of the PROP_CHANGE component requires that the kind of changes (a through d) and the relevant slot be specified. In addition, the system should try to avoid circular propagation of these changes. This is done through a stack that keeps track of the current inheritance chain being examined. The general scheme is described below:

For each child frame of the current frame do the following:

1. Examine if the child is the "real" parent 51, since in the case of multiple inheritance the child may have two parents. The "real" parent can be determined by the link at the value slot level. Once the real child is found, call PROP_CHANGE recursively if the action is not that of category (a) 52, 53, since deletion of a slot needs to be stopped once a locally specified slot is identified and this is done in (2).

2. If the action to be propagated is the deletion of the slot (i.e., category (a)), examine if the child slot is locally specified 54. A non-locally specified child slot is inherited entirely from its parental slot, whereas a locally specified child slot may inherit some attributes that are not locally specified. Thus, if a locally specified slot is encountered, PROP_CHANGE needs to be called at once with the change action modified as undoing inheritance (i.e., category (c)) 55. Otherwise, PROP_CHANGE is called recursively with the delete action specified 56. Actual deletion of slot is performed from the grandchild level to the grandparent level, since the parent-child link is needed to determine the real parent-child connection. Upon each deletion of the slot, there needs to be local changes to other kinds of objects (i.e., rules and instances) referencing this slot.

3. If the action to be propagated is changing some attribute values (i.e., category (b)) 57, determine whether the attribute is locally specified 58. When the attribute is not locally specified, it may be inherited from the parent. Thus, in this case, if the attribute change is affecting the other kinds of inter-related objects, they need to be reprocessed 59.

4. If the change action requested is of category (c) 60, each attribute of the slot is being examined whether it is locally specified 61. For each non-locally specified attribute, the value is reverted to the system default one, so inheritance can be re-propagated in the second pass 62. In addition, the other kinds of inter-related objects affected by the change of attributes are being reprocessed.

5. If the change action specified is the addition of a slot to a frame 63, the instances have to be reprocessed 64. Inheritance to other frames will be carried out in the second pass by step (6).

6. Mark the frame child as unprocessed, so the second pass will process it again for inheritance 64.

As described before, the PROP_CHANGE component is initiated in the step (4) of the CHANGE_OBJECT component. The appropriate action passed is important and is dependent on the type of change performed by the knowledge engineer. The CHANGE_OBJECT and PROP_CHANGE components provide a powerful means to perform detailed analysis on the change made by the knowledge engineer, and to propagate this change intelligently throughout the data structures representing the knowledge base. As a result, the repercussions of the change are minimized.

Using the foregoing specifications the invention may be implemented using standard programming and/or engineering techniques. The resulting program(s) may be stored on disk, diskettes, memory cards, ROM or any other memory device. For execution, the program may be loaded into the RAM of the computer. One skilled in the art of computer science will easily be able to combine the software created as described with appropriate general purpose or special purpose computer hardware to create a computer system embodying the invention. While the preferred embodiment of the present invention has been illustrated in detail, it should be apparent that modifications and adaptations to that embodiment may occur to one skilled in the art without departing from the scope of the present invention as set forth in the following claims.

What is claimed is:

1. A program storage device readable by a machine, tangibly embodying a program of instructions executable by the machine to perform method steps for incrementally processing a source representation of a set of knowledge- or object-based objects into an intermediate representation, the objects having a previous intermediate representation, said method steps comprising:

(a) making a change in a source representation of a first object;

(b) transferring information identifying the change made in the source representation of the first object to a parser;

(c) running the parser on the modified source representation of the first object to check for correct syntax;

(d) preparing a list of changed facets of the first object included in the change;

(e) for a selected changed facet performing the following steps:

(i) examining characteristics of the change in order to determine effects of a change to a facet of the changed object;

(ii) if the selected changed facet affects the first object, then modify the previous intermediate representation of the first object to implement the change;

(iii) if the selected changed facet affects objects referencing or being referenced by the first object, then detach all references to the first object and modify the intermediate representation of the objects referencing or being referenced by the first object to implement the change;

(iv) if the selected changed facet modifies an attribute of a first set of objects, propagating the change to each of the intermediate representations of the objects in the first set of objects and then recursively repeating the propagating step for each of the objects in the first set of objects until the attribute changes to each modified object have been propagated;

(f) repeating step (e) for each changed facet in the list; and (g) performing semantic checking on each of the objects changed in step (e).

2. The program storage device of claim 1 wherein the propagating action of method step (e)(iv) is performed by a callable re-entrant procedure (PROP_CHANGE) which accepts an object and an action code as parameters, the action codes being "Type A" for deletion of a slot, "Type B" for modification of an attribute of a slot, "Type C" for undoing of inheritance for attributes of a slot, and "Type D" for addition of a slot, the first object being a parent object of one or more child objects and one or more of the child objects inheriting attributes from the parent object, the PROP_CHANGE procedure of step (e)(iii) further comprising the following method steps executed for each child object:

(a) if the child object does not inherit attributes from the parent, then returning to a point from which PROP_CHANGE was last called;

(b) if modification of an attribute is caused by a deletion of a slot, then if the slot is locally specified, recursively calling PROP_CHANGE with the child object and "Type C" as the parameters for PROP_CHANGE, else:

recursively calling PROP_CHANGE with the child object and "Type A" as the parameters for PROP_CHANGE;

deleting the slot;

modifying the intermediate representation of objects inter-related with the child object to implement the change;

(c) recursively calling PROP_CHANGE with the child object and the action code as the parameters for PROP_CHANGE;

(d) if the modification of an attribute is caused by a "Type B" action and if the attribute is not locally specified, then processing inter-related objects to implement the change;

(e) if the modification of an attribute is caused by a "Type C" action and if the attribute is not locally specified, then reverting to a default attribute and processing inter-related objects to implement the change;

(f) if the modification of an attribute is caused by a "Type D" action, then reprocessing static instances to implement the change; and (g) marking the child object for inheritance during semantic checking.

3. A computer program product for use in knowledge- or object-based systems, said computer program product comprising:

a computer readable medium having computer readable program means embodied in said medium for causing a computer to incrementally process a source representation of a set of objects into an intermediate representation, the objects having a previous intermediate representation, comprising:

(a) computer readable program code means for making a change in a source representation of a first object;

(b) computer readable program code means for transferring information identifying the change made in the source representation of the first object to a parser;

(c) computer readable program code means for running the parser on the modified source representation of the first object to check for correct syntax;

(d) computer readable program code means for preparing a list of changed facets of the first object included in the change;

(e) computer readable program code means for examining the characteristics of the change in order to determine the effects of a change to a facet of the changed object;

(f) computer readable program code means for modifying the previous intermediate representation of the first object when the selected changed facet affects the first object;

(g) computer readable program code means for detaching the references to the first object and modifying the intermediate representation of the objects referencing or being referenced by the first object to implement the change when the selected changed facet affects objects referencing or being referenced by the first object;

(h) computer readable program code means for recursively propagating the change to each of the intermediate representation of the objects in the first set of objects when the selected changed facet modifies an attribute of a first set of objects, and repeatedly activating the propagating means for each of the objects in the first set of objects until the attribute changes to each modified object have been propagated;

(i) computer readable program code means for repeatedly activating means (e), (f) and (g) for each changed facet in the list; and (j) computer readable program code means for performing semantic checking on each of the objects changed.

* * * * *